United States Patent [19]

Kayane et al.

[11] Patent Number: 4,843,149
[45] Date of Patent: Jun. 27, 1989

[54] FIBER REACTIVE YELLOW DYE OF ACETOACETONILIDE HAVING VINYL SULFONE-TYPE REACTIVE GROUP

[75] Inventors: Yutaka Kayane, Ibaraki; Hirokazu Sawamoto, Minoo; Takashi Omura, Ashiya; Naoki Harada, Suita; Akira Takeshita, Toyonaka, all of Japan

[73] Assignee: Sumitomo Chemical Company, Limited, Osaka, Japan

[21] Appl. No.: 797,488

[22] Filed: Nov. 13, 1985

[30] Foreign Application Priority Data

Nov. 20, 1984 [JP] Japan .................................. 59-245670
Dec. 27, 1984 [JP] Japan .................................. 59-279450

[51] Int. Cl.$^4$ ...................... C09B 62/08; C09B 62/51; D06P 1/38; D06P 3/66
[52] U.S. Cl. ................................ 534/632; 534/592; 534/598; 534/617; 534/636; 534/635; 534/638; 534/642; 534/742; 534/573
[58] Field of Search .............. 534/632, 638, 626, 637, 534/636, 67

[56] References Cited

U.S. PATENT DOCUMENTS

| | | | |
|---|---|---|---|
| 3,223,470 | 12/1965 | Boedeker et al. | 534/638 X |
| 3,544,547 | 12/1970 | Crabtree et al. | 534/638 X |
| 4,118,382 | 10/1978 | Jager et al. | 534/632 X |
| 4,341,699 | 7/1982 | Tezuka et al. | 534/638 |
| 4,412,948 | 11/1983 | Omura et al. | 534/637 |
| 4,425,270 | 1/1984 | Yamada et al. | 534/637 |

FOREIGN PATENT DOCUMENTS

| | | | |
|---|---|---|---|
| 2632812 | 1/1978 | Fed. Rep. of Germany | 534/632 |
| 1335735 | 7/1963 | France | 534/632 |
| 2359183 | 2/1978 | France | 534/632 |
| 56-112584 | 9/1981 | Japan | 534/632 |

OTHER PUBLICATIONS

Chemical Abstracts, vol. 96, No. 6, Feb. 1982, p. 89, #36862d.

*Primary Examiner*—Floyd D. Higel
*Attorney, Agent, or Firm*—Stevens, Davis, Miller & Mosher

[57] ABSTRACT

A monoazo compound, or a salt thereof, represented by the formula,

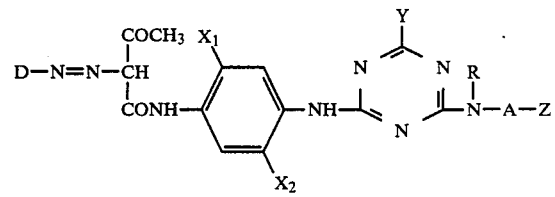

wherein D is a sulfophenyl group substituted with a methyl, ethyl, methoxy, ethoxy, phenoxy, acetylamino, pripionylamino, benzoylamino, carboxybenzoylamino, maleinylamino or succinylamino group, a naphthyl group substituted with two or three sulfo groups of a group of the formula

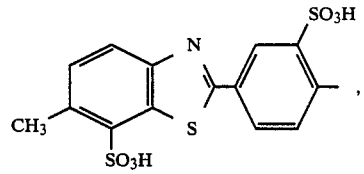

any one of $X_1$ or $X_2$ is a sulfo group and the other is a methoxy or ethoxy group, Y is a fluorine or chlorine atom or an arylamino group substituted with one or two sulfo groups, R is a hydrogen atom or an unsubstituted or substituted lower alkyl group, A is an unsubstituted or substitued phenylene or naphthylene group, and Z is $-SO_2CH=CH_2$ or $-SO_2CH_2CH_2Z_1$ in which $Z_1$ is a group capable of being split by the action of an alkali, which is useful as a fiber-reactive dye for dyeing materials in a greenish yellow color excellent in various fastness properties.

8 Claims, No Drawings

FIBER REACTIVE YELLOW DYE OF ACETOACETONILIDE HAVING VINYL SULFONE-TYPE REACTIVE GROUP

The present invention relates to a monoazo compound, a method for producing the same and a method for dyeing materials using the same.

More specifically, the invention relates to a fiber-reactive monoazo compound useful for dyeing fiber materials in a brilliant greenish yellow color excellent in fastness properties, a method for producing the same and a method for dyeing fiber materials using the same.

There are many fiber-reactive dyes useful for dyeing fiber materials in a greenish yellow color. However, most of them have defects in fastness properties, particularly chlorine fastness, because of a pyrazolone coupler being used for their production. Certain kinds of compounds disclosed in Published Unexamined Japanese Patent Application Nos. 12933/1978 and 112584/1981 have been proposed in order to improve such defects. These known compounds, however, still wait for an improvement of dye performances such as fastness properties including chlorine fastness and build-up properties to meet with severe requirements in a recent dyeing industry.

The present inventors have undertaken an extensive study to find a compound capable of meeting with such severe requirements and giving dyed products of a greenish yellow color excellent in dye performances such as fastness properties including particularly chlorine fastness and build-up property with good reproducibility even at a wide range of dyeing temperatures, and then found a specific monoazo compound.

Thus, the present invention provides a monoazo compound, or a salt thereof, represented by the following formula (I),

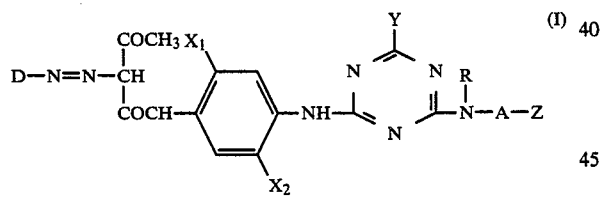

wherein D is a sulfophenyl group substituted with a methyl, ethyl, methoxy, ethoxy, phenoxy, acetylamino, propionylamino, benzoylamino, carboxybenzoylamino, maleinylamino or succinylamino group, a naphthyl group substituted with two or three sulfo groups or a group of the formula,

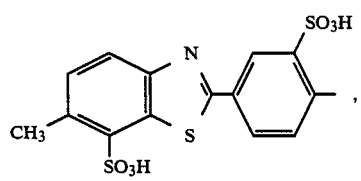

any one of $X_1$ or $X_2$ is a sulfo group and the other is a methoxy or ethoxy group, Y is a fluorine or chlorine atom or an arylamino group substituted with one or two sulfo groups, R is a hydrogen atom or an unsubstituted or substituted lower alkyl group, A is an unsubstituted or substituted phenylene or naphthylene group, and Z is —$SO_2CH=CH_2$ or —$SO_2CH_2CH_2Z_1$, in which $Z_1$ is a group capable of being split by the action of an alkali.

The present invention also provides a method for producing the monoazo compound of the formula (I), which comprises (1) subjecting cyanuric chloride or cyanuric fluoride to condensation with a monoazo amine compound of the following formula (II),

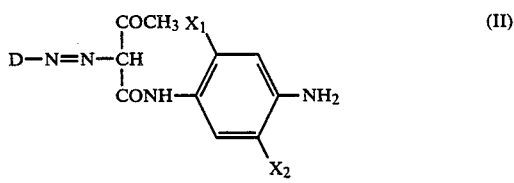

wherein D, $X_1$ and $X_2$ are as defined above, and an arylamine of the following formula (III),

wherein R, A and Z are as defined above, in an optional order, if desired, together with a sulfoarylamine of the following formula (IV),

wherein $Y_1$ is an arylamino group substituted with one or two sulfo groups, (2) subjecting cyanuric chloride or cyanuric fluoride to condensation with an amine compound of the following formula (V),

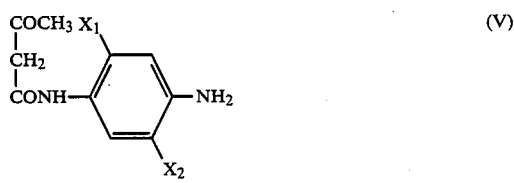

wherein $X_1$ and $X_2$ are as defined above, optionally together with at least one of the arylamine (III) and the sulfoarylamine (IV) in an optional order, and subjecting the obtained condensate to coupling with a diazonium salt of an aromatic amine of the following formula (VI),

wherein D is as defined above, and if the arylamine (III) is not used in the above condensation, then subjecting the resulting product to condensation with the arylamine (III) optionally together with the sulfoarylamine (IV) also it not used above, (3) subjecting cyanuric chloride or cyanuric fluoride to condensation with a phenylenediamine of the following formula (VII),

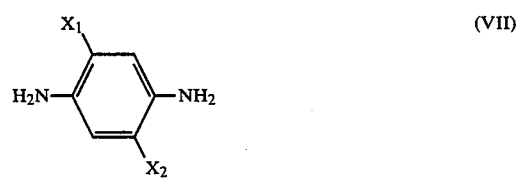

wherein $X_1$ and $X_2$ are as defined above, optionally together with at least one of the arylamine (III) and the sulfoarylamine (IV) in an optional order, followed by reaction with diketene, subjecting the obtained product to coupling with the diazonium salt of the aromatic amine (VI), and if the arylamine (III) is not used in the above condensation, then subjecting the resulting product to condensation with the arylamine (III) optionally together with the sulfoarylamine (IV) also if not used above, or (4) subjecting cyanuric chloride or cyanuric fluoride to condensation with the phenylenediamine (VII) optionally together with at least one of the arylamine (III) and the sulfoarylamine (IV) in an optional order, followed by reaction with diketene, subjecting the condensate to condensation with the arylamine (III) if not used in the above condensation optionally together with the sulfoarylamine (IV) also if not used above, and then subjecting the resulting product to coupling with the diazonium salt of the aromatic amine (VI).

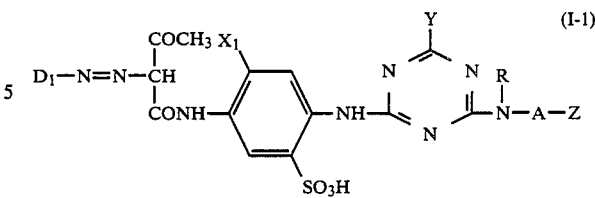

wherein $D_1$ is a 2-sulfo or 2-methoxy phenyl group substituted with a methyl, ethyl, methoxy, ethoxy, phenoxy, acetylamino, propionylamino, benzoylamino, carboxybenzoylamino, maleinylamino or succinylamino group at 4-or 5-position, or a naphthyl group substituted with two or three sulfo groups, $X_1$ is a methoxy or ethoxy group, and Y, R, A and Z are as defined above,

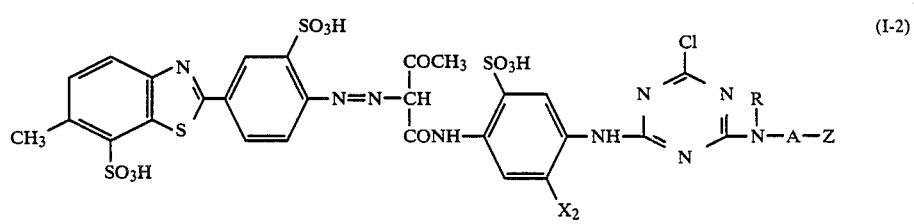

Further, the present invention provides a method for dyeing materials, which comprises using the monoazo compound of the formula (I).

Still further, the present invention provides a dye composition comprising two monoazo compounds which are different from each other and selected from the monoazo compounds of the formula (I) in a mixing weight ratio of 10:90 to 90:10.

Among the monoazo compounds (I) of the present invention, preferred are those, or their salts, of the following formulae;

wherein $X_2$ is a methoxy or ethoxy group, and R, A and Z are as defined above, and

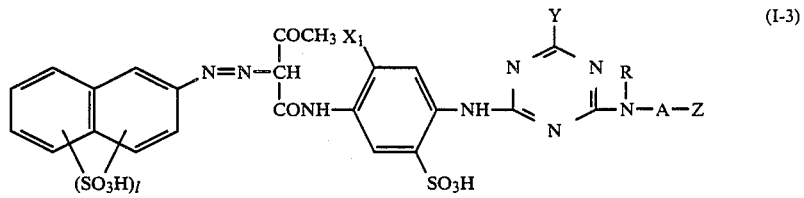

wherein $X_1$ is a methoxy or ethoxy group, l is 2 or 3, and Y, R, A and Z are as defined above.

In the above formulae (I-1), (I-2) and (I-3), a preferred $X_1$ or $X_2$ is a methoxy group, a preferred Y is a chlorine atom, and a preferred A is a phenylene group which may be substituted. In the formula (I-3), more preferred are those compounds wherein one of two or three sulfo groups is positioned at the carbon atom adjacent to the carbon atom linked to the azo group.

Of these, more preferred are those, or their salt, of the following formulae:

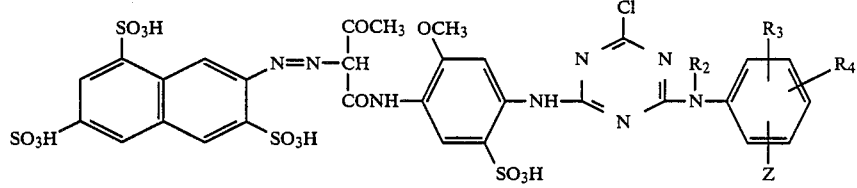

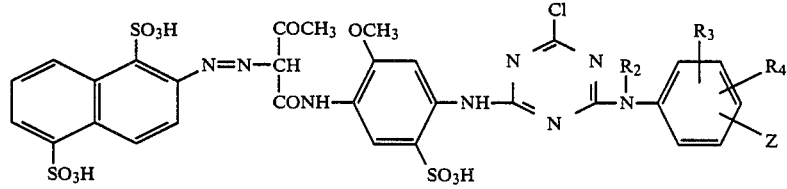

-continued

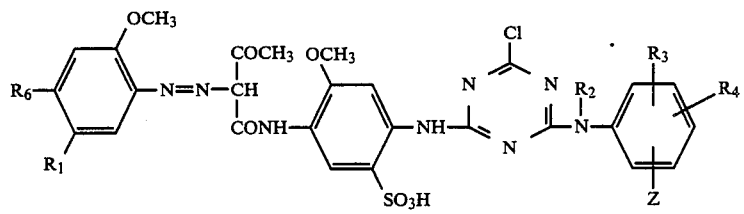

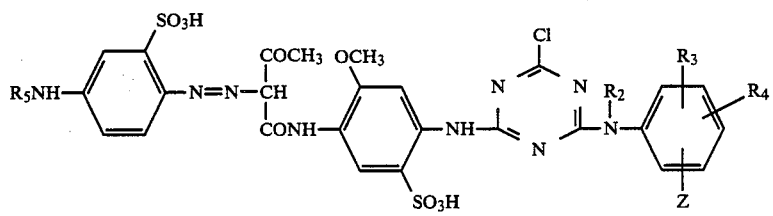

In the above formulae, any one of $R_1$ or $R_6$ is a sulfo group, and the other is a hydrogen atom or a methyl, ethyl or ethoxy group, $R_2$ is a hydrogen atom or a methyl or ethyl group, $R_3$ and $R_4$ are independently a hydrogen atom or a methyl or methoxy group, $R_5$ is an acetyl, propionyl, maleinyl or succinyl group, and Z is as defined above.

Particularly preferred are those, or their salts, of the following formulae:

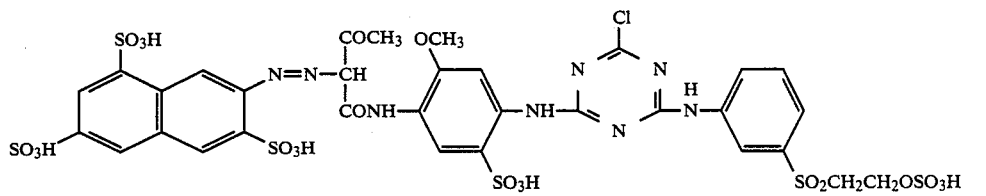

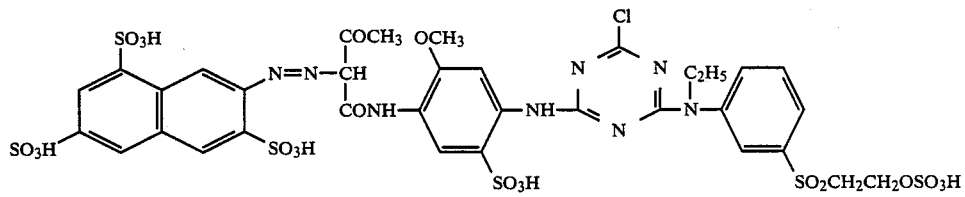

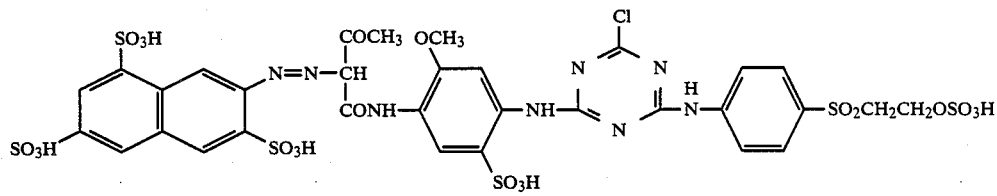

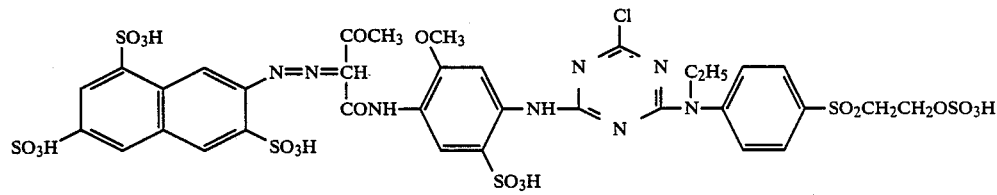

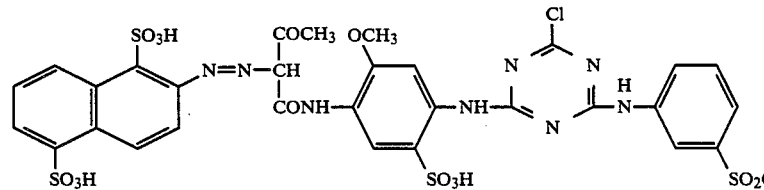

These compounds in accordance with the present invention may be in the form of a free acid or a salt of metals such as alkali metals and alkaline earth metals. Of these, preferred is a sodium, potassium or lithium salt.

The group $Z_1$ capable of being split by the action of an alkali includes, for example, a sulfuric acid ester, thiosulfuric acid ester, phosphoric acid ester or acetic acid ester group, or a halogen atom.

In the above formula (I), preferred A includes phenyl group unsubstituted or substituted with one or two members selected from chlorine and bromine atoms and methyl, ethyl, methoxy, ethoxy and sulfo groups, and a naphthylene group unsubstituted or substituted with one sulfo group. Examples thereof are as follows:

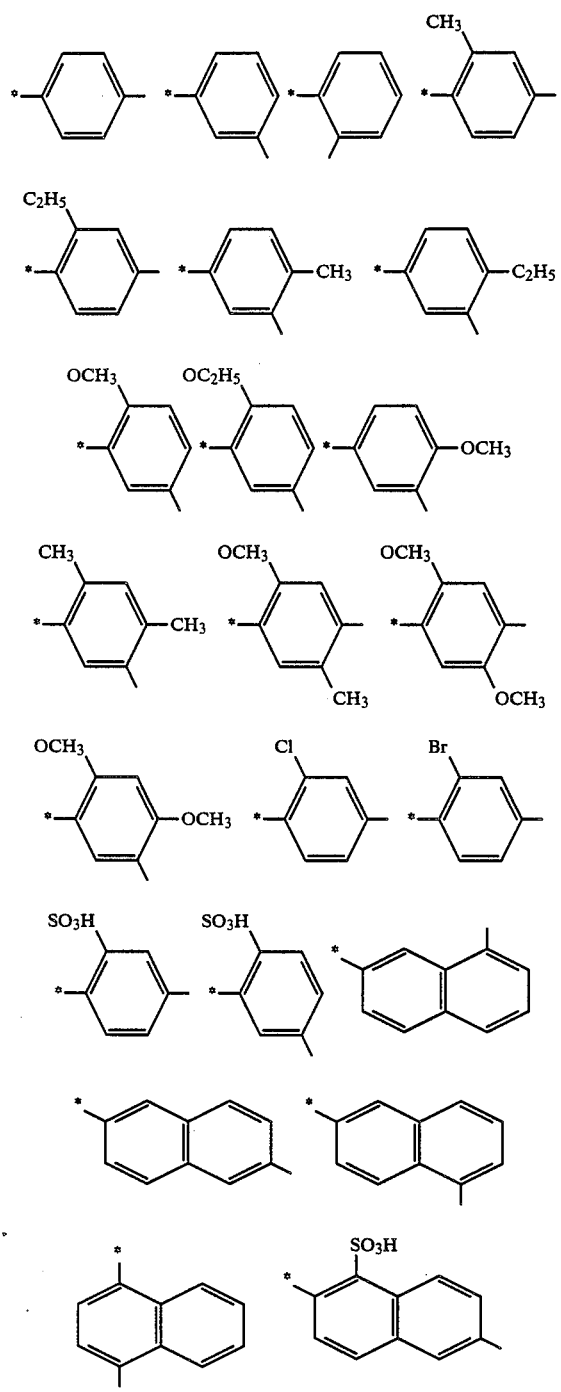

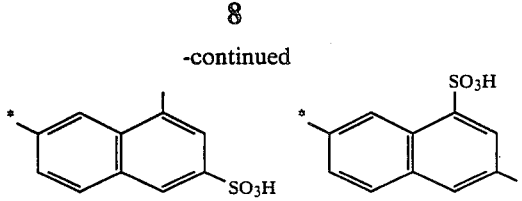

(In the above formulae, the asterisked linkage is bonded to the group

With respect to the lower alkyl group represented by R, the alkyl is preferably the one having 1 to 4 carbon atoms, and the substituent which may be appended to the alkyl includes, for example, a halogen atom and a hydroxyl, cyano, alkoxy, carboxy, carbamoyl, alkoxycarbonyl, alkylcarbonyloxy, sulfo or sulfamoyl group. Examples of R are besides hydrogen, methyl, ethyl, n-propyl, isopropyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl, and the like. Of these, particularly preferred are hydrogen, methyl and ethyl.

Examples of the sulfophenyl and sulfonaphthyl groups represented by D are as follows:

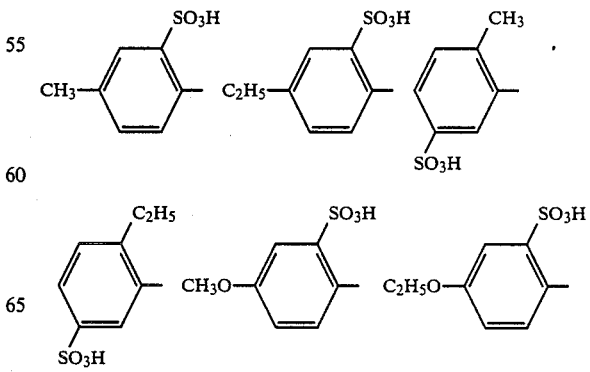

-continued
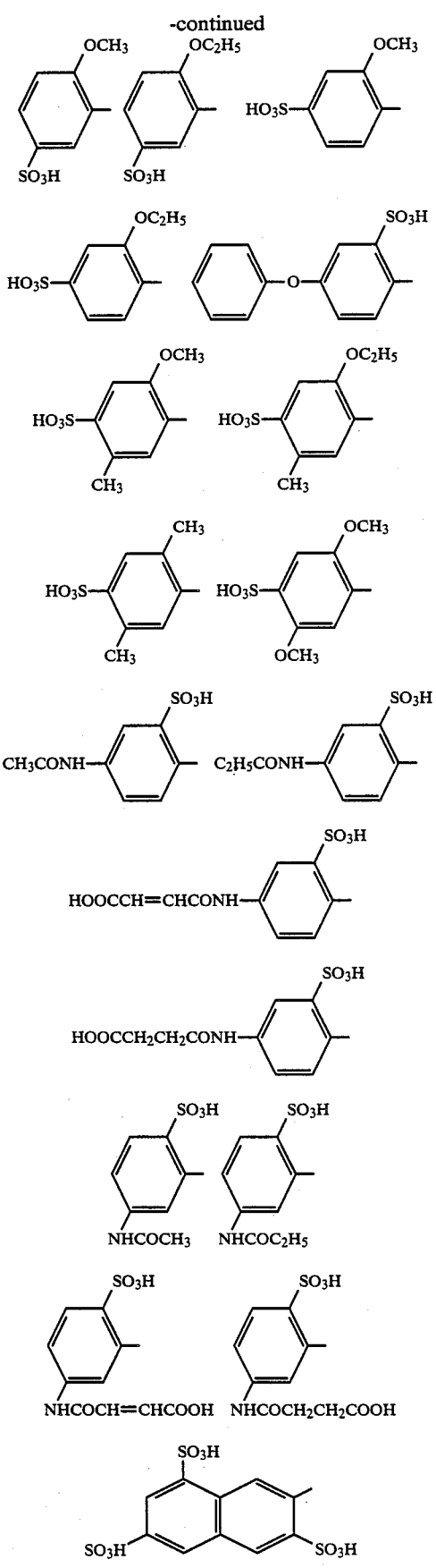
Of these, preferred are as follows:
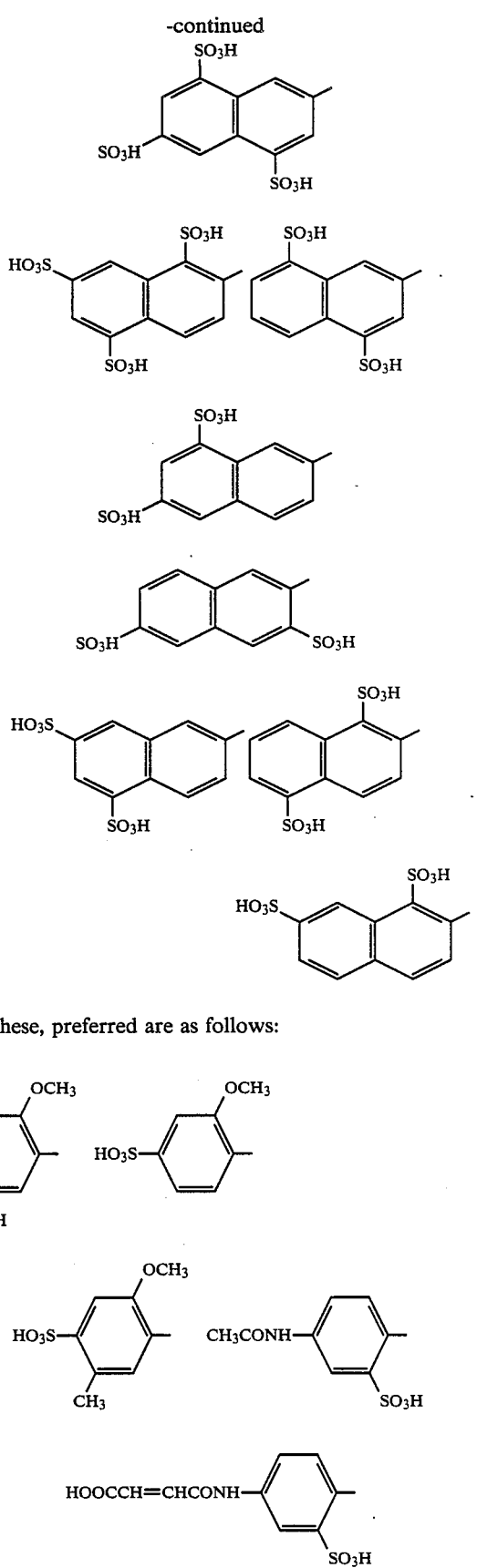

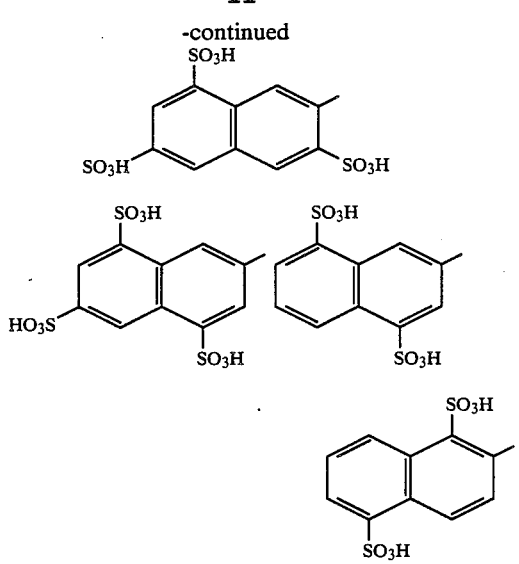

Examples of the one or two sulfo substituted-arylamino group represented by Y are as follows:

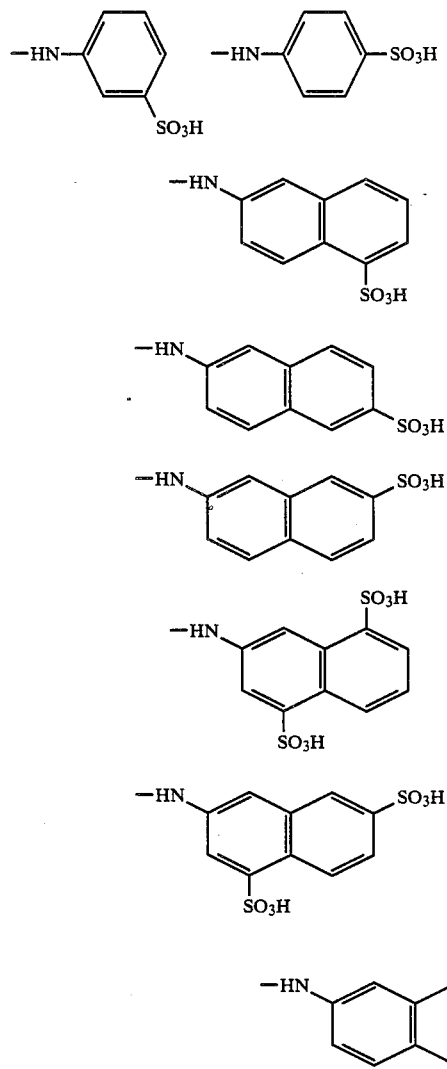

Particularly preferred Y is a chlorine atom.

The monoazo compound (I) of the present invention can be produced in the following manners.

Cyanuric chloride or fluoride is subjected to first condensation with any one of the monoazo amine compound (II) or the arylamine (III), followed by second condensation with the remaining amine, thereby obtaining a desired monoazo compound of the following formula (I'),

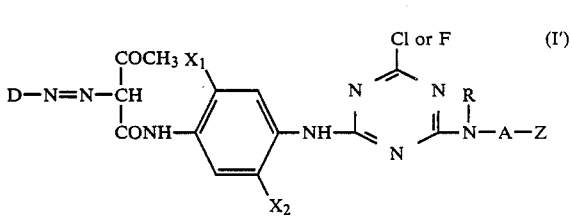

wherein D, $X_1$, $X_2$, R, A and Z are as defined above.

The first and second condensations can be carried out in an aqueous medium at a temperature ranging from 0° C. to 30° C., while controlling the pH within a range of 2 to 7, and at a temperature ranging from 20° C. to 60° C., while controlling the pH within a range of 3 to 7, respectively.

If desired, the monoazo compound (I') can be subjected to third condensation with the sulfoarylamine (IV), obtaining another desired monoazo compound of the following formula (I''),

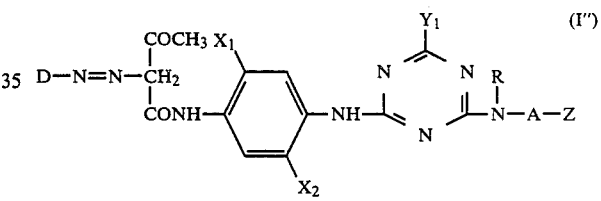

wherein D, $X_1$, $X_2$, $Y_1$, R, A and Z are as defined above. The third condensation which may be conducted prior to the first or second condensation can be carried out in an aqueous medium at a temperature ranging from 60° C. to 90° C., while controlling the pH within a range of 3 to 6.

In another manner, cyanuric chloride or fluoride is subjected to first condensation with any one of the amine compound (V) or the arylamine (III), followed by second condensation with the remaining amine, obtaining an intermediate compound of the following formula (IX),

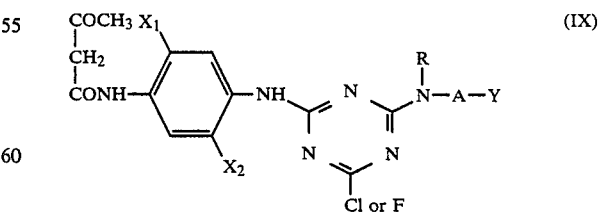

wherein $X_1$, $X_2$, R, A and Z are as defined above.

The first and second condensations can be carried out in an aqueous medium at a temperature ranging from 0° C. to 30° C., while controlling the pH within a range of 2 to 7, and at a temperature ranging from 20° C. to 60°

C., while controlling the pH within a range of 3 to 7, respectively.

Successively, the intermediate compound (IX) is subjected to coupling with a diazonium salt of the aromatic amine (VI), which can be produced in a conventional manner, in an aqueous medium at a temperature ranging from 0° C. to 50° C., while controlling the pH within a range of 4 to 8, whereby the desired monoazo compound (I') can be produced.

If desired, the monoazo compound (I') can be subjected to third condensation with the sulfoarylamine (IV) in the manner described above, obtaining another desired monoazo compound (I''). The third condensation may be conducted prior to the first or second condensation.

The desired monoazo compound can be also produced in the following manner.

Cyanuric chloride or fluoride is subjected to first condensation with any one of the phenylenediamine (VII) or the arylamine (III), followed by second condensation with the remaining amine.

The first and second condensations can be carried out in an aqueous medium at a temperature ranging from 0° C. to 30° C., while controlling the pH within a range of 2 to 7, and at a temperature ranging from 20° C. to 60° C., while controlling the pH within a range of 3 to 7, respectively.

Successively, the resulting condensate is subjected to reaction with diketene at a temperature ranging from 10° C. to 50° C., while controlling the pH within a range of 3 to 7, whereby the intermediate compound (IX) can be produced.

Then, the intermediate compound (IX) is subjected to coupling with the diazonium salt of the aromatic amine (VI) in the manner described above, whereby the desired monoazo compound (I') can be produced.

In the above manner, if the first condensation is carried out using the phenylenediamine (VII), the reaction using diketene may be conducted immediately after the first condensation.

If desired, the monoazo compound (I') obtained may be subjected to third condensation with the sulfoarylamine (IV), obtaining another desired monoazo compound (I''). Likewise, the third condensation may be conducted prior to the first or second condensation.

The monoazo compound (I), or a salt thereof, of the present invention has a fiber-reaction group, and can be used for dyeing (including printing) hydroxyl group- or nitrogen-containing materials, which are preferably in a fibrous form. The fiber materials may be blended products.

When applied for dyeing fiber materials, the monoazo compound (I) obtained can be used each alone or in a mixture of two different from each other. The mixture in a mixing weight ratio of 10:90 to 90:10 can be expected to exhibit more excellent dye performances.

The hydroxyl group-containing materials include natural or synthetic hydroxyl group-containing fiber materials such as cellulose fiber materials, regenerated products thereof and polyvinyl alcohol. Examples of the cellulose fiber materals are cotton and other vegetable fibers such as linen, hemp, jute and ramie fibers. Examples of the regenerated cellulose fibers are viscose staple and filament viscose.

The nitrogen-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the present compound by an exhaustion dyeing, padding or printing method.

The exhaustion dyeing method can be carried out at a relatively low temperature in the presence of an acid binding agent such as sodium carbonate, trisodium phosphate, sodium hydroxide and the like, if desired using a neutral salt such as sodium sulfate, sodium chloride and the like, optionally together with dissolving assistants, penetrants or level dyeing agents. The neutral salt which can be used for promoting exhaustion of the dye may be added to a dye bath at the time when a bath temperature reaches a level desired for dyeing, or prior thereto. Alternatively, the neutral salt may be added thereto dividedly.

The padding method can be carried out by padding the fiber materials at ambient temperature or an elevated temperature, and after drying, steaming or dry-heating the materials to perform the dye-fixation. The padding can be also carried out by a cold pad batch method.

The printing can be carried out in a onephase or two-phase manner. The one-phase printing may be conducted by printing the fiber materials with a printing paste containing an acid binding agent such as sodium hydrogencarbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or a dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogen carbonate, sodium carbonate, sodium formate, potassium carbonate, sodium dihydrogen phosphate, disodium hydrogen phosphate, trisodium phosphate, sodium silicate, sodium trichloroacetate and the like.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as a condensation product between cyanuric chloride and 3 times by mole of aminobenzenesulfonic acid or aminonaphthalenesulfonic acid, or an addition product between stearylamine and ethylene oxide, and the like.

The present monoazo compound (I) can be characterized by excellent dye performances in the dyeing (including printing) of fiber materials, particularly cellulose fiber materials. For example, the compound can give a dyed product excellent in light fastness, perspiration-light fastness, wet fastness such as washing resistance, peroxide-washing resistance, chlorine resistance, chlorine bleaching resistance, perspiration resistance and acid-hydrolysis resistance, and alkali fastness, abrasion fastness and iron fastness. The compound can also exhibit excellent build-up, level dyeing and wash-off properties, favorable solubility and high exhaustion and fixation percentages. Moreover, the present monoazo compound (I) can hardly be affected by changes in a dyeing temperature and a dyeing bath ratio, so that a dyed product with a constant quality can be given with superior reproducibility.

As compared with those described in the aforesaid Published Unexamined Japanese Patent Application Nos. 12933/1978 and 112584/1981, the monoazo compound (I) of the present invention shows more excellent dye performances such as build-up property to give dyed products of a deeper color, and fastness properties, particularly light fastness, perspiration-light fastness and chlorine fastness.

The present invention is illustrated in more detail with reference to the following Examples, which are only illustrative. In Examples, parts and % are by weight.

EXAMPLE 1

To a solution prepared by dissolving 4-methoxy-2,5-diaminobenzenesulfonic acid (6.5 parts) in water (200 parts) at a pH of between 6 and 7, diketene (2.5 parts) was added dropwise over 1 hour at a temperature of between 10° C. and 20° C., and the mixture was stirred for 2 hours at that temperature. A dispersion of cyanuric chloride (5.5 parts) in ice water (100 parts) was added dropwise to the above reaction mixture at a temperature of between 0° C. and 5° C. over 1 hour, during which the pH was adjusted to between 3 and 4 using a 20% aqueous sodium carbonate solution, and the mixture was stirred for additional 2 hours.

To the reaction mixture was added 1-aminobenzene-3-β-sulfatoethylsulfone (8.4 parts), and the mixture was heated to 30° C., while adjusting the pH to between 3 and 6 using a 20% aqueous sodium carbonate solution, and stirred for 2 hours at that temperature and that pH. Thereafter, a diazonium solution of 2-aminonaphthalene-3,6,8-trisulfonic acid (11.5 parts) was added to the reaction mixture cooled to a temperature of between 0° C. and 5° C. over 1 hour, during which the pH was adjusted to between 5 and 6 using a 20% aqueous sodium carbonate solution. The mixture was stirred for 3 hours at that temperature and that pH, and then mixed with sodium chloride (70 parts). The precipitated crystals were separated by filtration and dried at 60° C. to obtain a monoazo compound of the following formula.

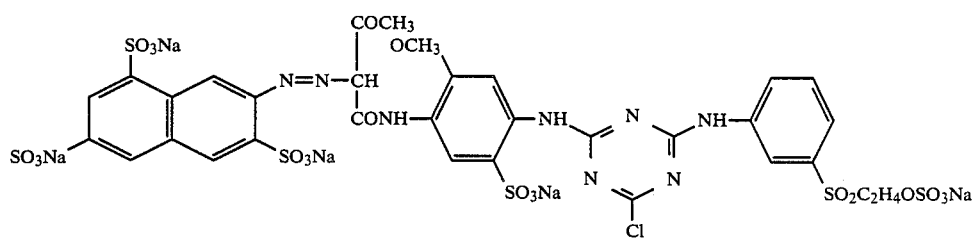

(λ max 397 nm)

EXAMPLES 2 to 10

Example 1 was repeated, provided that 1-aminobenzene-3-β-sulfatoethylsulfone and 2-aminonaphthalene-3,6,8-trisulfonic acid were replaced by the arylamine (III) and the aromatic amine (VI) as shown in the following Table, respectively, then obtaining the corresponding monoazo compound.

TABLE

| Example No. | Arylamine (III) | Aromatic amine (VI) | Color on cotton |
|---|---|---|---|
| 2 | H₂N—⟨benzene⟩—SO₂C₂H₄OSO₃H | naphthalene with SO₃H, SO₃H, SO₃H, NH₂ | Greenish yellow |
| 3 | HN(C₂H₅)—⟨benzene⟩—SO₂C₂H₄OSO₃H | " | " |
| 4 | H₂N—⟨benzene with OCH₃⟩—SO₂C₂H₄OSO₃H | " | " |

TABLE-continued

| Example No. | Arylamine (III) | Aromatic amine (VI) | Color on cotton |
|---|---|---|---|
| 5 | 3-(N-ethylamino)phenyl-SO₂C₂H₄OSO₃H | " | " |
| 6 | 3-aminophenyl-SO₂C₂H₄OSO₃H | 2-amino-5,8-disulfonaphthalene | " |
| 7 | 4-aminophenyl-SO₂C₂H₄SSO₃H | 2-amino-5-sulfonaphthalene-1-sulfonic acid | Greenish yellow |
| 8 | 3-aminophenyl-SO₂C₂H₄OSO₃H | 2-amino-4,6,8-trisulfonaphthalene | " |
| 9 | 6-amino-2-(β-sulfatoethylsulfonyl)naphthalene | " | " |
| 10 | 3-(N-methylamino)phenyl-SO₂C₂H₄OSO₃H | 2-amino-6,8-disulfonaphthalene | " |

EXAMPLE 11

To a solution prepared by dissolving 4-methoxy-2,5-diaminobenzenesulfonic acid (6.5 parts) in water (150 parts) at a pH of between 5 and 6, diketene (2.5 parts) was added dropwise at a temperature of between 20° C. and 25° C. over 20 minutes, and the mixture was stirred for 2 hours at that temperature. To a dispersion of cyanuric chloride (5.5 parts) in ice water (150 parts) was added dropwise the above reaction mixture at a temperature of between 0° C. and 5° C. over 1 hour, during which the pH was adjusted to a pH of between 3 and 4 using a 15% aqueous sodium carbonate solution, and the mixture was stirred for additional 2 hours. Successively, 1-aminobenzene-4-β-sulfatoethylsulfone (8.4 parts) was added thereto, and the mixture was heated to 50° C., while adjusting the pH to between 5 and 6 using a 15% aqueous sodium carbonate solution, and stirred for 3 hours at that temperature and that pH. Thereafter, a diazonium solution of 2-aminoanisole-4-sulfonic acid (6.1 parts) was added to the above reaction mixture cooled to a temperature of between 0° C. and 5° C. over 1 hours, during which the pH was kept to between 5 and 6 using a 15% aqueous sodium carbonate solution, and the resulting mixture was stirred for 3 hours at that temperature and that pH. Then, the reaction mixture was mixed with sodium chloride (60 parts) to precipitate crystals. The crystals were separated by filtration and dried at 60° C. to obtain a monoazo compound of the following formula.

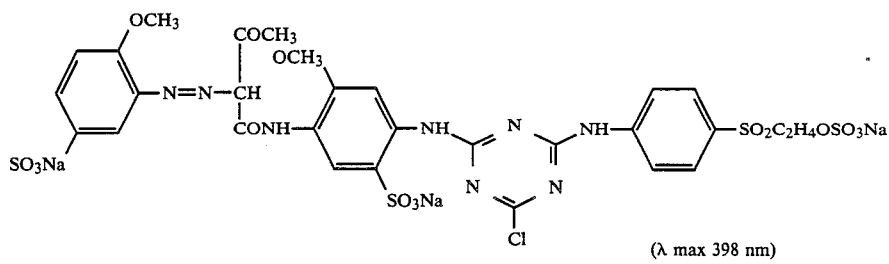

(λ max 398 nm)

EXAMPLES 12 TO 29

Example 11 was repeated, provided that 1-aminobenzene-4-β-sulfatoethylsulfone and 2-aminoanisole-4-sulfonic acid were replaced by the arylamine (III) and the aromatic amine (VI) as shown in the following Table, respectively, thereby obtaining the corresponding monoazo compound.

TABLE

| Example No. | Arylamine (III) | Aromatic amine (VI) | Color on cotton |
|---|---|---|---|
| 12 | H₂N—⟨⟩—SO₂C₂H₄OSO₃H (meta) | OCH₃, NH₂, SO₃H substituted benzene | Greenish yellow |
| 13 | H₂N—⟨⟩—OCH₃ / SO₂C₂H₄OSO₃H | " | " |
| 14 | H₂N—⟨⟩—SO₂CH=CH₂ | " | " |
| 15 | H₂N—⟨⟩—SO₂C₂H₄OSO₃H (meta) | OCH₃, HO₃S—, NH₂ substituted benzene | " |
| 16 | H₂N—⟨⟩—SO₂C₂H₄OCOCH₃ | OCH₃, HO₃S—, NH₂ substituted benzene | Greenish yellow |
| 17 | H₂N—⟨⟩—SO₂C₂H₄OSO₃H | OC₂H₅, NH₂, SO₃H substituted benzene | " |
| 18 | H₂N—⟨⟩—SO₂C₂H₄OSO₃H (meta) | OCH₃, NH₂, SO₃H substituted benzene | " |

TABLE-continued

| Example No. | Arylamine (III) | Aromatic amine (VI) | Color on cotton |
|---|---|---|---|
| 19 | " | 4-amino-2-methoxy-5-methylbenzenesulfonic acid (OCH$_3$, HO$_3$S, NH$_2$, CH$_3$ substituents) | " |
| 20 | 7-amino-1-sulfo-3-(β-sulfatoethylsulfonyl)naphthalene (H$_2$N-naphthalene-SO$_3$H, SO$_2$C$_2$H$_4$OSO$_3$H) | " | " |
| 21 | H$_2$N-C$_6$H$_4$-SO$_2$C$_2$H$_4$OSO$_3$H | 2-amino-3-ethyl-5-sulfobenzene (C$_2$H$_5$, NH$_2$, SO$_3$H) | Greenish yellow |
| 22 | H$_2$N-C$_6$H$_4$-SO$_2$C$_2$H$_4$Cl (meta) | 2-amino-4-methoxy-1-sulfobenzene (SO$_3$H, CH$_3$O, NH$_2$) | " |
| 23 | H$_2$N-C$_6$H$_3$(OCH$_3$)-SO$_2$C$_2$H$_4$OSO$_3$H | 2-amino-4-phenoxy-1-sulfobenzene (SO$_3$H, phenoxy, NH$_2$) | " |
| 24 | H$_2$N-C$_6$H$_4$-SO$_2$C$_2$H$_4$OSO$_3$H (meta) | 4-amino-5-ethoxy-2-methylbenzenesulfonic acid (OC$_2$H$_5$, HO$_3$S, NH$_2$, CH$_3$) | " |
| 25 | " | 2-amino-4-acetamido-1-sulfobenzene (SO$_3$H, CH$_3$CONH, NH$_2$) | " |
| 26 | H$_2$N-C$_6$H$_4$-SO$_2$C$_2$H$_4$OPO$_3$H$_2$ | 2-amino-4-acetamido-1-sulfobenzene (SO$_3$H, CH$_3$CONH, NH$_2$) | Greenish yellow |
| 27 | H$_2$N-C$_6$H$_3$(CH$_3$)-SO$_2$C$_2$H$_4$OSO$_3$H | 2-amino-4-propionamido-1-sulfobenzene (SO$_3$H, C$_2$H$_5$CONH, NH$_2$) | " |
| 28 | H$_2$N-C$_6$H$_4$-SO$_2$C$_2$H$_4$OSO$_3$H (meta) | 2-amino-4-succinamido-1-sulfobenzene (SO$_3$H, HOOCCH$_2$CH$_2$CONH, NH$_2$) | " |

TABLE-continued

| Example No. | Arylamine (III) | Aromatic amine (VI) | Color on cotton |
|---|---|---|---|
| 29 | " | 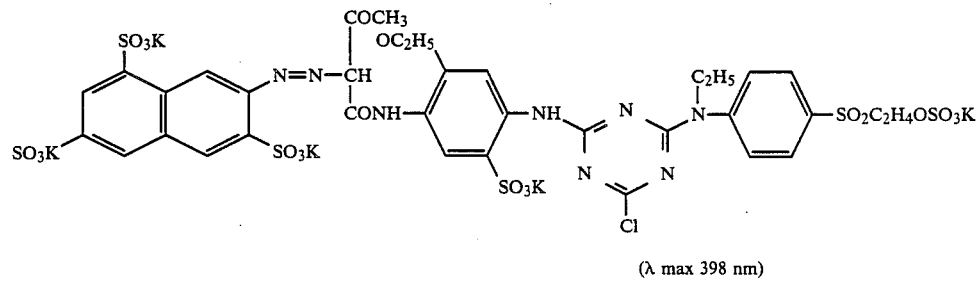 HOOCCH=CHCONH—[benzene ring with SO₃H and NH₂] | Yellow |

EXAMPLE 30

To a solution prepared by dissolving 4-ethoxy-2,5-diaminobenzenesulfonic acid (6.5 parts) in water (200 parts) at a pH of between 6 and 7, diketene (2.5 parst) was added dropwise at a temperature of between 10° C. and 20° C. over 30 minutes, and the mixture was stirred for 2 hours at that temperature. To this reaction mixture was added a condensate solution prepared by the reaction between cyanuric chloride (5.5 parts) and 1-N-ethylaminobenzene-4-β-sulfatoethylsulfone (9.3 parts) at a temperature of between 5° C. and 10° C. and at a pH of between 4 and 5, and the mixture was heated to 50° C., while adjusting the pH to between 4 and 5 using a 15% aqueous sodium carbonate solution, and then stirred for 6 hours at that temperature. A diazonium solution of 2-aminonaphthalene-3,6,8-trisulfonic acid (11.5 parts) was added dropwise to the above reaction mixture over 1 hour, during which the pH was kept to between 5 and 6 using a 10% aqueous potassium carbonate solution and the mixture was stirred for 3 hours at that temperature and that pH. Thereafter, the reaction mixture was mixed with potassium chloride (80 parts) to precipitate crystals. The crystals separated by filtration was dried at 60° C. to obtain a monoazo compound of the following formula.

[Structure: naphthalene with SO₃K, SO₃K, SO₃K substituents—N=N—CH(COCH₃)(CONH—)—phenyl ring with OC₂H₅ and SO₃K—NH—triazine (with Cl)—N(C₂H₅)—phenyl—SO₂C₂H₄OSO₃K]

(λ max 398 nm)

EXAMPLES 31 to 39

Example 30 was repeated, provided that 1-N-ethylaminobenzene-4-β-sulfatoethylsulfone and 2-aminonaphthalene-3,6,8-trisulfonic acid used in Example 30 were replaced by the arylamine (III) and the aromatic amine (VI) as shown in the following Table, respectively, thereby obtaining the corresponding monoazo compound.

TABLE

| Example No. | Arylamine (III) | Aromatic amine (VI) | Color on cotton |
|---|---|---|---|
| 31 | C₂H₄OH—HN—[benzene]—SO₂C₂H₄OSO₃H | [naphthalene with SO₃H, SO₃H, SO₃H and NH₂] | Greenish yellow |
| 32 | H₂N—[benzene]—SO₂C₂H₄OSO₃H | [naphthalene with SO₃H, SO₃H and NH₂] | " |
| 33 | C₂H₅—HN—[benzene]—SO₂C₂H₄OSO₃H | [benzene with OCH₃, SO₃H and NH₂] | " |

TABLE-continued

| Example No. | Arylamine (III) | Aromatic amine (VI) | Color on cotton |
|---|---|---|---|
| 34 | CH₃–NH–C₆H₄–SO₂C₂H₄OSO₃H | " | " |
| 35 | C₃H₇–NH–C₆H₄–SO₂C₂H₄OSO₃H | 2-OCH₃, 4-HO₃S, 1-NH₂ benzene | Greenish yellow |
| 36 | C₄H₉–NH–C₆H₄–SO₂C₂H₄OSO₃H | 2-OCH₃, 4-HO₃S, 5-CH₃, 1-NH₂ benzene | " |
| 37 | C₂H₄COOH–NH–C₆H₄–SO₂C₂H₄OSO₃H | 2-SO₃H, 1-NH₂, 4-NHCOCH₃ benzene | " |
| 38 | C₂H₅–NH–C₆H₄–SO₂CH=CH₂ | 2-SO₃H, 1-NH₂, 4-NHCOCH=CHCOOH benzene | " |
| 39 | C₂H₄CONH₂–NH–C₆H₄–SO₂C₂H₄OSO₃H | 2-OCH₃, 4-HO₃S, 5-OCH₃, 1-NH₂ benzene | Yellow |

EXAMPLE 40

The monoazo compound (0.3 part) obtained in Example 1 was dissolved in water (200 parts), and sodium sulfate (10 parts) and cotton (10 parts) were added thereto. The bath was heated to 60° C., and then sodium carbonate (4 parts) was added thereto. Dyeing was continued for 1 hour at that temperature.

The cotton was rinsed with water, soaped and again rinsed with water to obtain a dyed product of a brilliant greenish yellow color excellent in fastness properties, particularly light fastness, perspirationlight fastness and chlorine fastness. The monoazo compound was found to exhibit good build-up property and good reproducibility of the dyeing.

EXAMPLE 41

The monoazo compound (0.5 part) obtained in Example 11 was dissolved in water (150 parts), and sodium sulfate (10 parts) and cotton (10 parts) were added thereto. The bath was heated to 50° C., and then sodium carbonate (5 parts) was added thereto. Dyeing was continued for 1 hour at that temperature.

The cotton was rinsed with water, soaped and again rinsed with water to obtain a dyed product of a brilliant greenish yellow color excellent in fastness properties, particularly, light fastness, perspiration-light fastness and chlorine fastness. The monoazo compound used was found to exhibit good build-up property and good reproducibility of the dyeing.

EXAMPLE 42

Composition of color paste

| | |
|---|---|
| Monoazo compound obtained in Example 1 | 3 parts |
| Urea | 5 parts |
| Sodium alginate (5%), thickener | 50 parts |
| Hot water | 25 parts |
| Sodium hydrogencarbonate | 2 parts |
| Balance (water) | 15 parts |

Mercerized cotton cloth was printed with the color paste having the above composition, and then pre-dried, steamed at 100° C. for 5 minutes, rinsed with hot water, soaped, again rinsed with hot water, and dried.

Thus, a printed product of a brilliant greenish yellow color excellent in fastness properties was obtained.

EXAMPLE 43

To a solution prepared by dissolving 4-methoxy-2,5-diaminobenzenesulfonic acid (6.5 parts) in water (150 parts) at a pH of between 6 and 7 was added dropwise diketene (2.5 parts) at a temperature of between 10° C. and 20° C. over 30 minutes, and the mixture was stirred for 2 hours at that temperature and then cooled to a temperature of between 0° C. and 5° C. Cyanuric fluoride (4.1 parts) was added dropwise thereto over 30 minutes, during which the pH was adjusted to between 6 and 7 using a 7% aqueous sodium hydrogencarbonate solution. Successively 1-aminobenzene-3-β-sulfatoethylsulfone (8.4 parts) was added thereto, while adjusting the pH to between 6 and 7 using a 7% aqueous sodium hydrogencarbonate solution, and the mixture was heated to 20° C., and stirred for 3 hours at that temperature. Thereafter, a diazonium solution of 2-aminonaphthalene-3,6,8-trisulfonic acid (11.5 parts) was added dropwise to the above reaction mixture cooled to a temperature of between 0° C. and 5° C. over 1 hour, during which the pH was adjusted to between 5 and 6 using a 7% aqueous sodium hydrogencarbonate solution. The mixture was stirred for 3 hours at that temperature and that pH, and then mixed with sodium chloride (70 parts). The crystals precipitated was separated by filtration and dried in vacuo at 40° C. to obtain a monoazo compound of the following formula.

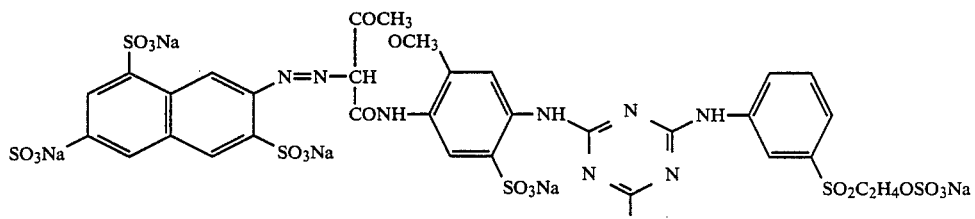

(λ max 397 nm)

EXAMPLES 44 to 52

Example 43 was repeated, provided that 1-aminobenzene-3-β-sulfatoethylsulfone and 2-aminonaphthalene-3,6,8-trisulfonic acid used in Example 43 were replaced by the arylamine (III) and the aromatic amine (VI) as shown in the following Table, respectively, thereby obtaining the corresponding monoazo compound.

TABLE

| Example No. | Arylamine (III) | Aromatic amine (VI) | Color on cotton |
|---|---|---|---|
| 44 | H₂N—⟨⟩—SO₂CH=CH₂ | naphthalene with SO₃H, SO₃H, SO₃H, NH₂ | Greenish yellow |
| 45 | H₂N—⟨⟩(OCH₃)—SO₂C₂H₄OSO₃H | naphthalene with SO₃H, SO₃H, NH₂ | " |
| 46 | H₂N—⟨⟩—SO₂C₂H₄OSO₃H | HO₃S—⟨⟩(OCH₃)—NH₂ | " |
| 47 | H₂N—⟨⟩—SO₂C₂H₄OSO₃H | ⟨⟩(OCH₃)(SO₃H)—NH₂ | " |
| 48 | " | HO₃S—⟨⟩(OCH₃)(CH₃)—NH₂ | " |

TABLE-continued

| Example No. | Arylamine (III) | Aromatic amine (VI) | Color on cotton |
|---|---|---|---|
| 49 | 3-(ethylamino)phenyl-SO$_2$C$_2$H$_4$OSO$_3$H (with HN-C$_2$H$_5$) | 4-methoxy-2-aminobenzenesulfonic acid (SO$_3$H, CH$_3$O, NH$_2$) | Greenish yellow |
| 50 | 3-(methylamino)phenyl-SO$_2$C$_2$H$_4$OSO$_3$H (with HN-CH$_3$) | CH$_3$CONH- substituted 2-aminobenzenesulfonic acid (SO$_3$H, NH$_2$) | " |
| 51 | 3-aminophenyl-SO$_2$C$_2$H$_4$OSO$_3$H (H$_2$N-) | HOOCCH$_2$CH$_2$CONH- substituted 2-aminobenzenesulfonic acid (SO$_3$H, NH$_2$) | " |
| 52 | 7-amino-3-(β-sulfatoethylsulfonyl)naphthalene-1-sulfonic acid (H$_2$N-, SO$_3$H, SO$_2$C$_2$H$_4$OSO$_3$H) | 4-acetamido-2-aminobenzenesulfonic acid (SO$_3$H, NH$_2$, NHCOCH$_3$) | " |

EXAMPLE 53

Metanilic acid (6.2 parts) was added to a solution prepared by dissolving in water (300 parts) the monoazo compound (27 parts) obtained in Example 11, and the mixture was heated to 80° C., while adjusting the pH to between 4 and 5 using a 15% aqueous sodium carbonate solution, and stirred for 3 hours at that temperature and that pH. Thereafter, the reaction mixture was mixed with sodium chloride (50 parts). The crystals precipitated were separated by filtration and dried at 60° C. to obtain a monoazo compound of the following formula.

EXAMPLE 54

The monoazo compound (25 parts) obtained in Example 25 was dissolved in water (400 parts). To this solution was added 2-aminonaphthalene-4,8-disulfonic acid (11 parts), and the mixture was heated to 80° C., while adjusting the pH to between 4 and 5 using a 15% aqueous sodium carbonate solution, and then stirred for 5 hours at that temperature and that pH. The reaction mixture was cooled to 30° C. and then mixed with sodium chloride (60 parts). The crystals precipitated were separated by filtration, and dried at 60° C. to obtain a monoazo compound of the following formula,

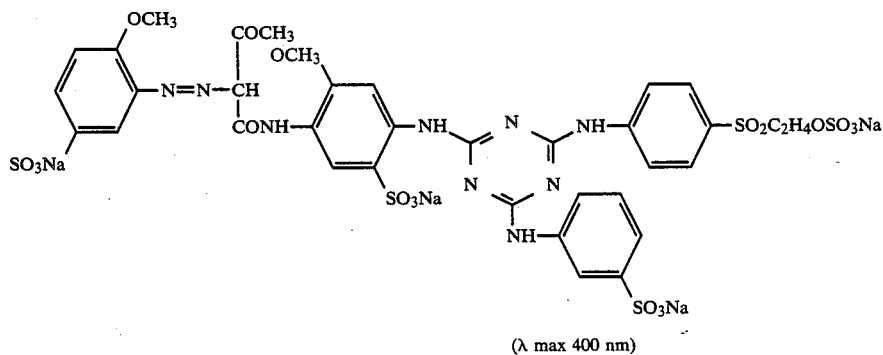

(λ max 400 nm)

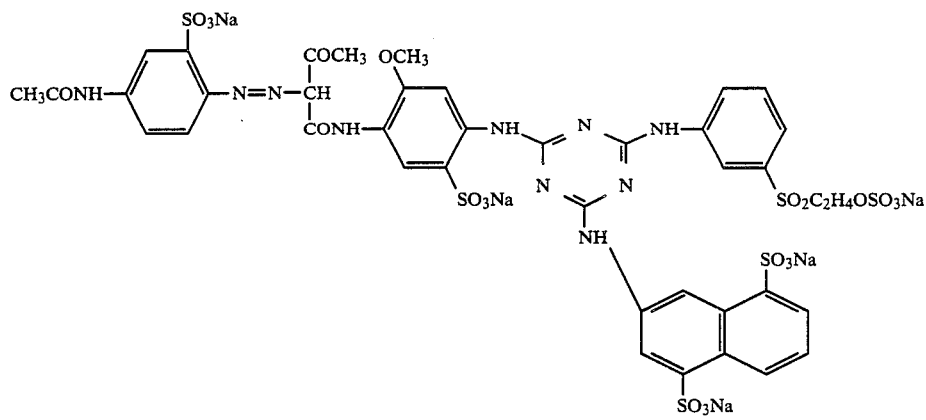
(λ max 396 nm)
EXAMPLES 55 TO 60
In a manner similar to that of Example 53, the following monoazo compounds were obtained.
EXAMPLE 55
EXAMPLE 56
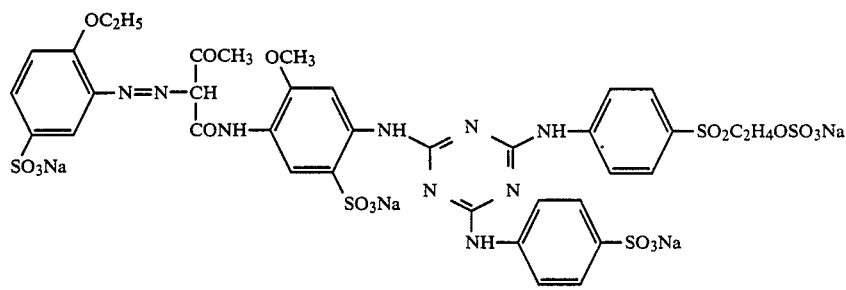
EXAMPLE 57
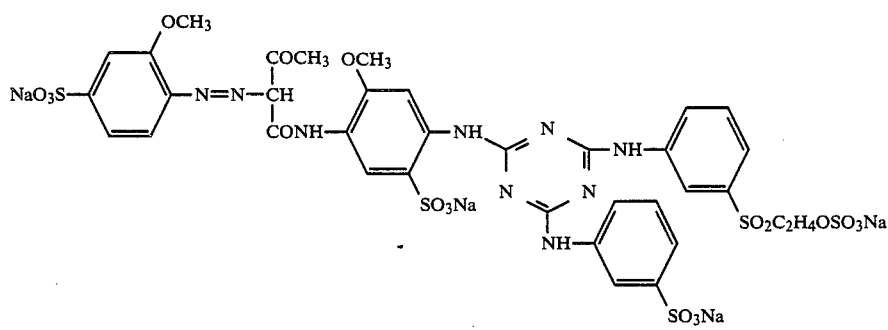
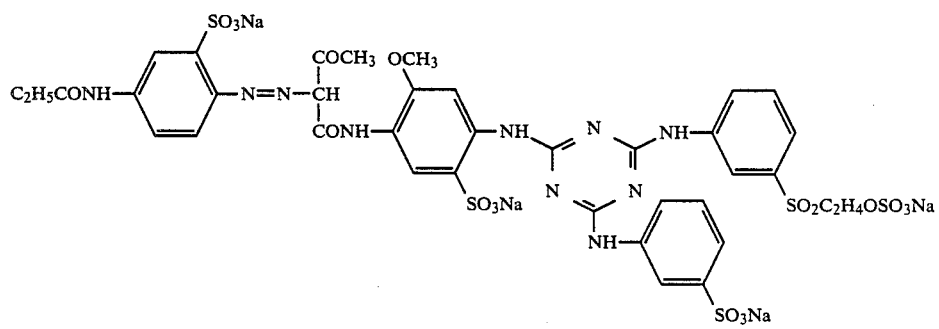

EXAMPLE 58

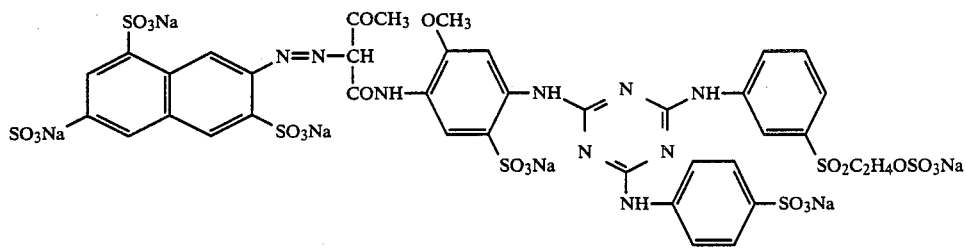

EXAMPLE 59

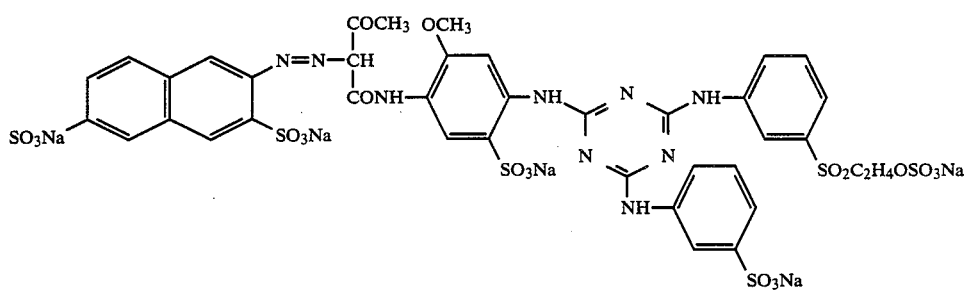

EXAMPLE 60

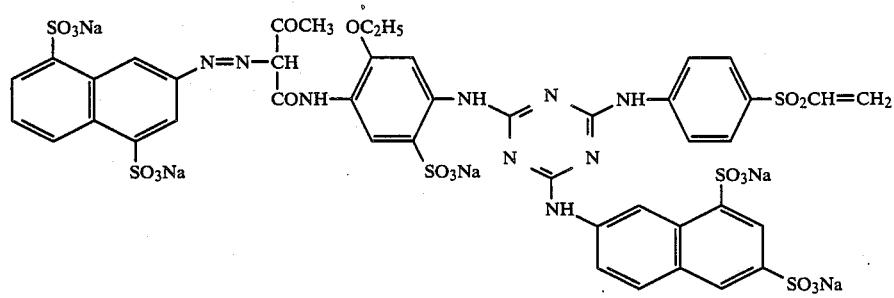

EXAMPLE 61

A mixture of the monoazo compound (0.2 part) obtained in Example 1 and the monoazo compound (0.2 part) obtained in Example 5 was dissolved in water (200 parts), and then sodium sulfate (10 parts) and cotton (10 parts) were added thereto. The bath was heated to 60° C., and sodium carbonate (4 parts) was added thereto. Dyeing was continued for 1 hour at that temperature.

The cotton was washed with water, soaped and again washed with water to obtain a dyed product of a brilliant greenish yellow color excellent in fastness properties, particularly light fastness, perspiration-light fastness and chlorine fastness. The above dye composition was also found to exhibit good build-up property and good reproducibility of the dyeing.

EXAMPLE 62

A mixture of the monoazo compound (0.3 part) obtained in Example 3 and the monoazo compound (0.2 part) obtained in Example 4 was dissolved in water (150 parts), and sodium sulfate (10 parts) and cotton (10 parts) were added thereto. The bath was heated to 50° C., and then sodium carbonate (5 parts) was added thereto. Dyeing was continued for 1 hour at that temperature.

The cotton was washed with water, soaped, and again washed with water to obtain a dyed product of a brilliant greenish yellow color excellent in fastness properties, particularly light fastness, perspiration-light fastness and chlorine fastness. The above dye composition was also found to exhibit good build-up property and good reproducibility of the dyeing.

EXAMPLE 63

A monoazo amine compound (21 parts) of the following formula,

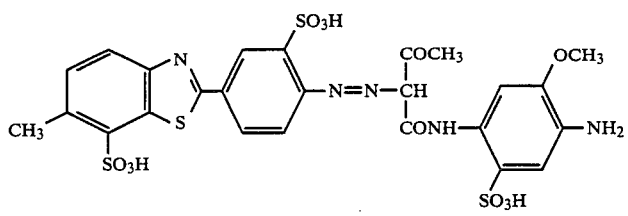

was added dropwise to a dispersion of cyanuric chloride (5.5 parts) in ice water (100 parts) at a temperature of between 0° C. and 10° C. over 1 hour, during which the pH was adjusted to between 3 and 4 using a 20% aqueous sodium carbonate solution, and the mixture was stirred for additional 2 hours.

Successively, 1-aminobenzene-3-β-sulfatoethylsulfone (8.4 parts) was added to the above reaction mixture, and the resulting mixture was heated to 30° C., while adjusting the pH to between 5 and 6 using a 20% aqueous sodium carbonate solution, and then stirred for 2 hours at that temperature and that pH. Thereafter, the reaction mixture was mixed with sodium chloride (70 parts). The crystals precipitated were collected on a filter, and dried to obtain a monoazo compound of the following formula.

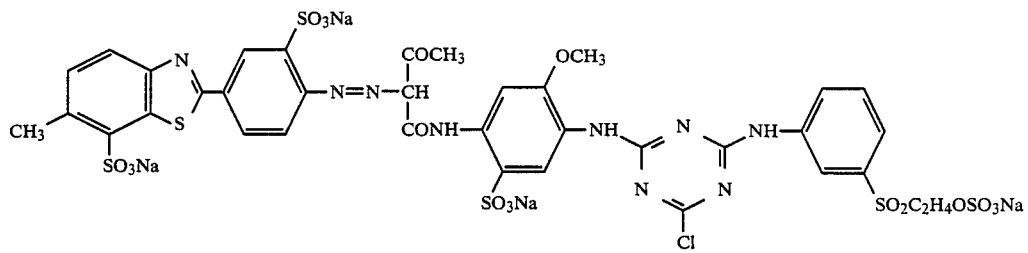

(λ max 394 nm)

EXAMPLES 64 TO 80

Example 63 was repeated, provided that the monoazoamine compound and 1-aminobenzene-3-β-sulfatoethylsulfone used in Example 63 were replaced by the monoazo amine compound (II) and the arylamine compound (III) as shown in the following Table, respectively, thereby obtaining the corresponding monoazo compound.

TABLE

| Example No. | Monoazo amine compound (II) D | $X_1$ | $X_2$ | Arylamine (III) |
|---|---|---|---|---|
| 64 | ![benzothiazole-phenyl with CH3, SO3H, SO3H] | SO₃H | OCH₃ | H₂N—⟨benzene⟩—SO₂C₂H₄OSO₃H (meta) |
| 65 | " | " | " | H₂N—⟨benzene⟩—SO₂C₂H₄OSO₃H (para) |
| 66 | ![benzothiazole-phenyl with CH3, SO3H, SO3H] | SO₃H | OC₂H₅ | H₂N—⟨benzene⟩—SO₂C₂H₄OSO₃H (meta) |
| 67 | " | " | OCH₃ | H₂N—⟨benzene⟩—SO₂CH=CH₂ (para) |

TABLE-continued

| Example No. | Monoazo amine compound (II) D | $X_1$ | $X_2$ | Arylamine (III) |
|---|---|---|---|---|
| 68 | 6-methyl-7-sulfo-benzothiazol-2-yl attached to 2-methyl-5-sulfo-phenyl (with SO$_3$H at position shown) | SO$_3$H | OCH$_3$ | 4-(SO$_2$C$_2$H$_4$OCOCH$_3$)aniline |
| 69 | " | " | " | 4-(SO$_2$C$_2$H$_4$Cl)aniline |
| 70 | " | " | " | 2-amino-6-(SO$_2$C$_2$H$_4$OSO$_3$H)naphthalene-1-sulfonic acid |
| 71 | " | SO$_3$H | OC$_2$H$_5$ | 7-amino-1-(SO$_2$C$_2$H$_4$OSO$_3$H)-3-sulfo-naphthalene |
| 72 | 6-methyl-7-sulfo-benzothiazol-2-yl attached to 2-methyl-5-sulfo-phenyl | SO$_3$H | OCH$_3$ | N-ethyl-3-(SO$_2$C$_2$H$_4$OSO$_3$H)aniline |
| 73 | " | " | " | N-methyl-4-(SO$_2$CH=CH$_2$)aniline |
| 74 | " | OCH$_3$ | SO$_3$H | N-propyl-3-(SO$_2$C$_2$H$_4$OSO$_3$H)aniline |
| 75 | " | " | " | N-(2-hydroxyethyl)-4-(SO$_2$C$_2$H$_4$OSO$_3$H)aniline |
| 76 | 6-methyl-7-sulfo-benzothiazol-2-yl attached to 2-methyl-5-sulfo-phenyl | OCH$_3$ | SO$_3$H | N-ethyl-4-(SO$_2$C$_2$H$_4$OSO$_3$H)aniline |
| 77 | " | " | " | 3-amino-(SO$_2$C$_2$H$_4$OSO$_3$H)benzene |

TABLE-continued

| Example No. | Monoazo amine compound (II) D | X₁ | X₂ | Arylamine (III) |
|---|---|---|---|---|
| 78 | " | " | " | $H_2N-\phantom{a}\langle\phantom{a}\rangle-SO_2C_2H_4OSO_3H$ |
| 79 | " | $OC_2H_5$ | " | $H_2N-\langle\rangle-OCH_3$ with $SO_2C_2H_4OSO_3H$ |
| 80 | " | " | " | $HN(-C_2H_4COOH)-\langle\rangle-SO_2C_2H_4OSO_3H$ |

EXAMPLE 81

A mixture of 1-aminobenzene-4-β-sulfatoethylsulfone (8.4 parts) in water (200 parts) was clarified by adjusting the pH to between 4 and 5 using a 20% aqueous sodium carbonate solution. Cyanuric chloride (5.5 parts) was added to the above clarified solution, and the mixture was stirred at a temperature of between 10° C. and 15° C. for 6 hours, during which the pH was adjusted to between 4 and 5. Successively, 2,5-diamino4-methoxybenzenesulfonic acid (5.6 parts) was added thereto, and the mixture was heated to a temperature between 20° C. and 25° C., while adjusting the pH between 4 and 5 using a 20% aqueous sodium carbonate solution, and then stirred for 5 hours. Thereafter, diketene (5 parts) was added thereto over 1 hour, and the mixture was stirred for 5 hours at a temperature of between 20° C. and 25° C. To the reaction mixture cooled to a temperature of between 0° C. and 5° C., a diazonium slurry of dehydrothio4-toluidinedisulfonic acid (12 parts) was added dropwise over 1 hour, during which the pH was adjusted to between 5 and 6 using a 20% aqueous sodium carbonate solution, and the mixture was stirred for 3 hours at that temperature and that pH. Thereafter, the reaction mixture was mixed with sodium chloride (50 parts). The crystals precipitated were collected on a filter, and dried at 60° C. to obtain a monoazo compound of the following formula.

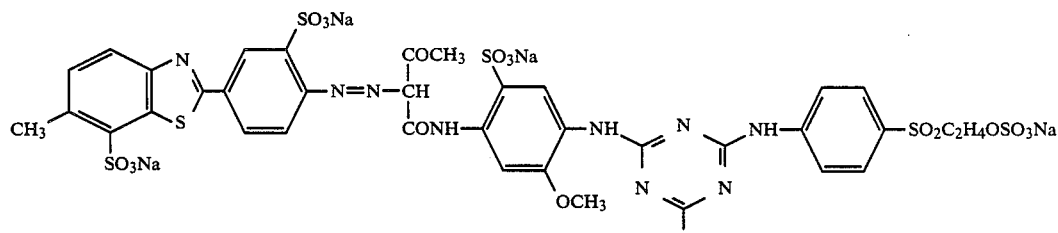

(λ max 400 nm)

EXAMPLE 82

The monoazo compound (0.3 part) obtained in Example 43 was dissolved in water (200 parts), and sodium sulfate (10 parts) and cotton (10 parts) were added thereto. The bath was heated to 50° C., and then sodium carbonate (4 parts) was added thereto. Dyeing was continued for 1 hour at that temperature.

The cotton was washed with water, soaped and again washed with water to obtain a dyed product of a brilliant greenish yellow color excellent in fastness properties, particularly light fastness, perspiration-light fastness and chlorine fastness.

EXAMPLE 83

The monoazo compound (0.1 part) obtained in Example 53 was dissolved in water (150 parts), and then sodium sulfate (10 parts) and cotton (10 parts) were added thereto. The bath was heated to 60° C., and then sodium carbonate (5 parts) was added thereto. Dyeing was continued for 1 hour at that temperature.

The cotton was washed with water, soaped, and again washed with water to obtain a dyed product of a brilliant greenish yellow color excellent in fastness properties, particularly light fastness, perspirationlight fastness and chlorine fastness.

EXAMPLE 84

Composition of color paste

| | |
|---|---|
| Monoazo compound obtained in Example 58 | 3 parts |
| Urea | 5 parts |
| Sodium alginate (5%), thickener | 50 parts |
| Hot water | 25 parts |
| Sodium hydrogencarbonate | 2 parts |
| Balance (water) | 15 parts |

Mercerized cotton cloth was printed with the color paste of the above composition, and then pre-dried, steamed at 100° C. for 5 minutes, rinsed with hot water, soaped, again rinsed with hot water, and dried, to obtain a printed product of a brilliant greenish yellow excellent in fastness properties.

What is claimed is:

1. A monoazo compound, or a salt thereof, represented by the formula,

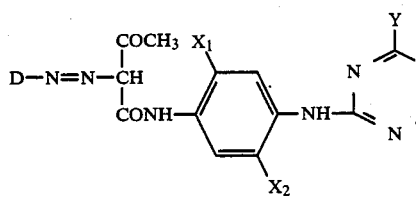

wherein D is sulfophenyl unsubstituted or substituted by methyl, ethyl, methoxy, ethoxy, phenoxy, acetylamino or propionylamino; naphthyl substituted twice or three times by sulfo; or a group of the formula,

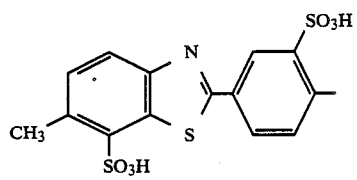

$X_1$ is methoxy or ethoxy and $X_2$ is sulfo when D is the sulfophenyl or the naphthyl as defined above, or any one of $X_1$ or $X_2$ is sulfo and the other is methoxy or ethoxy when D is the group of the above-defined formula; Y is fluorine, chlorine or phenyl- or naphthylamino substituted once or twice by sulfo; R is hydrogen or $C_1$-$C_4$ alkyl unsubstituted or substituted with carboxy or carbamoyl; A is phenyl unsubstituted or substituted once by methoxy, or naphthylene unsubstituted or substituted once by sulfo; and Z is —$SO_2CH=CH_2$ or —$So_2CH_2CH_2Z_1$ in which $Z_1$ is a group capable of being split by the action of an alkali.

2. A monoazo compound, or a salt thereof according to claim 1, wherein D is 2-sulfo or 2-methoxy-sulfophenyl substituted by methyl, ethyl, methoxy, ethoxy, phenoxy, acetylamino or propionylamino at the 4- or 5-position, or naphthyl substituted twice or three times by sulfo, $X_1$ is methoxy or ethoxy, and $X_2$ is sulfo.

3. A monoazo compound, or a salt thereof, according to claim 1, wherein D is a group of the formula,

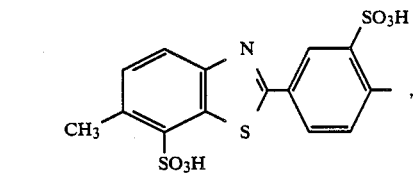

$X_1$ is sulfo, $X_2$ is methoxy or ethoxy, and Y is chlorine.

4. A monoazo compound, or a salt thereof, according to claim 1, wherein D is naphthyl of the formula,

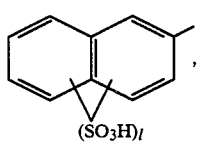

in which l is 2 or 3, $X_1$ is methoxy or ethoxy and $X_2$ is sulfo.

5. A monoazo compound, or a salt thereof, represented by the formula,

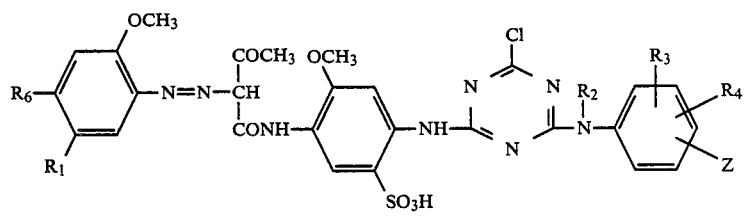

wherein any one of $R_1$ or $R_6$ is sulfo, and the other is hydrogen, methyl, ethyl or ethoxy, $R_2$ is hydrogen, methyl or ethyl, $R_3$ and $R_4$ are independently hydrogen or methoxy, and Z is —$SO_2CH=CH_2$ or —$SO_2CH_2CH_2Z_1$ in which $Z_1$ is a group capable of being split by the action of an alkali.

6. A monoazo compound, or a salt thereof, represented by the formula,

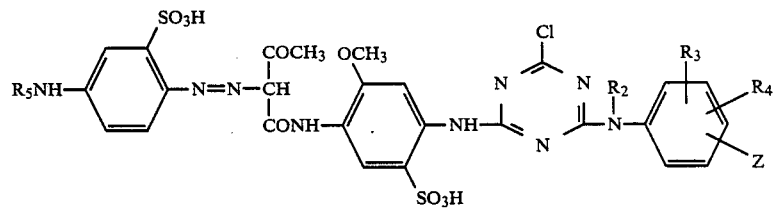

wherein $R_2$ is hydrogen, methyl or ethyl, $R_3$ and $R_4$ are independently hydrogen or methoxy, $R_5$ is acetyl or propionyl, and Z is —$SO_2CH=CH_2$ or —$SO_2CH_2CH_2Z_1$ in which $Z_1$ is a group capable of being split by the action of an alkali.

7. A monoazo compound, or a salt thereof, represented by the formula,

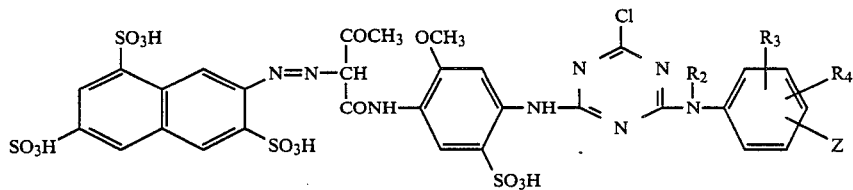

wherein $R_2$ is hydrogen, methyl or ethyl, $R_3$ and $R_4$ are independently hydrogen or methoxy, and Z is $-SO_2CH=CH_2$ or $-SO_2CH_2CH_2Z_1$ in which $Z_1$ is a group capable of being split by the action of an alkali.

8. A monoazo compound, or a salt thereof, represented by the formula,

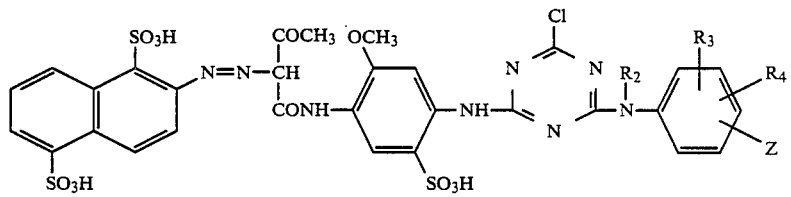

wherein $R_2$ is hydrogen, methyl or ethyl, $R_3$ and $R_4$ are independently hydrogen or methoxy, and Z is $-SO_2CH=CH_2$ or $-SO_2CH_2CH_2Z_1$ in which $Z_1$ is a group capable of being split by the action of an alkali.

* * * * *